COLOR TELEVISION SYSTEM PROVIDING AN ILLUSION OF DEPTH
Filed Sept. 14, 1964 4 Sheets-Sheet 1
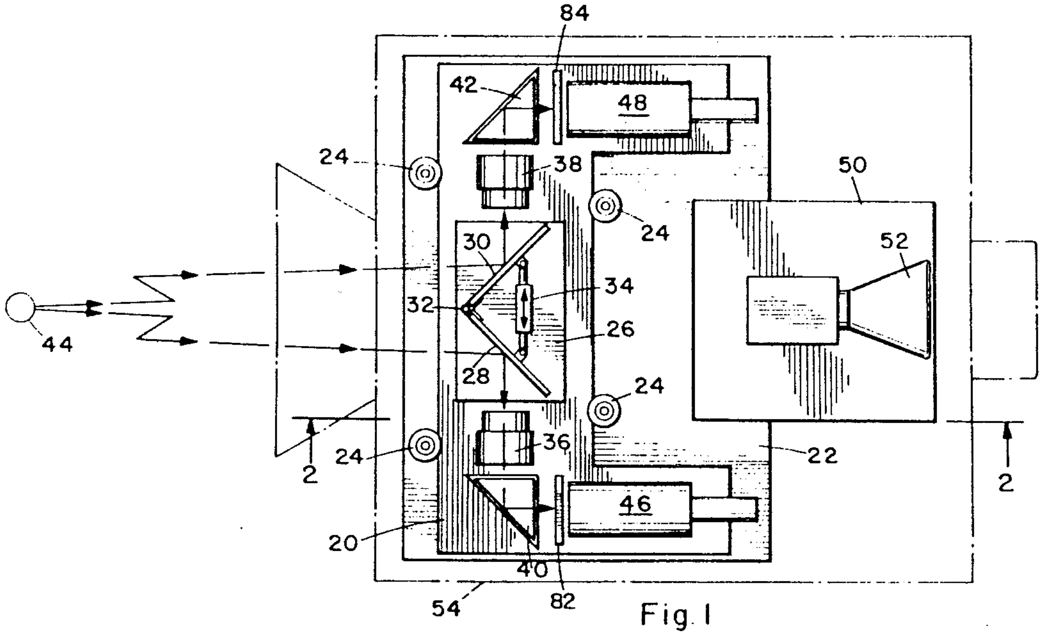
Fig. I
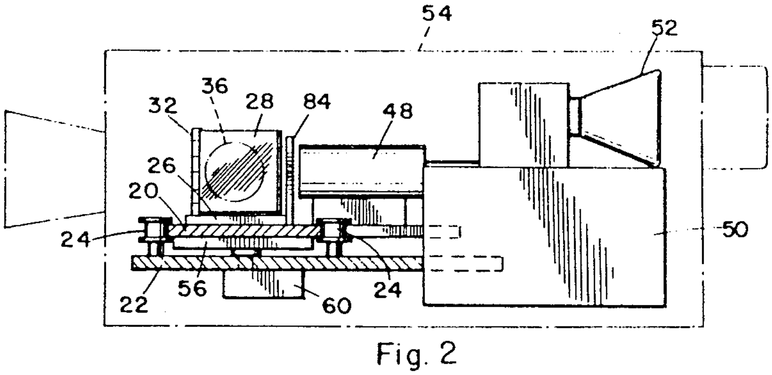
Fig. 2
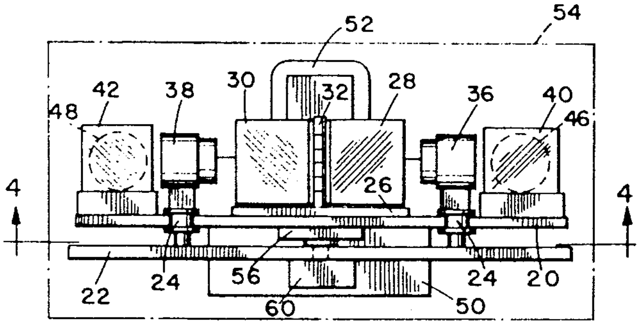
Fig. 3
INVENTOR.
JULIO B. CARRILLO
BY
Knox & Knox INVENTOR.
JULIO B. CARRILLO
BY Knox & Knox

COLOR TELEVISION SYSTEM PROVIDING AN ILLUSION OF DEPTH

Filed Sept. 14, 1964 4 Sheets-Sheet 3

INVENTOR.
JULIO B. CARRILLO
BY
Knox & Knox

INVENTOR.
JULIO B. CARRILLO
BY Knox & Knox 3,457,364
COLOR TELEVISION SYSTEM PROVIDING AN ILLUSION OF DEPTH Julio B. Carrillo, 1412 S. Citrus Ave., Fullerton, Calif. 92633
Filed Sept. 14, 1964, Ser. No. 396,287
Int. Cl. H04n 9/60, 3/28
U.S. Cl. 178—6.5 4 Claims

ABSTRACT OF THE DISCLOSURE

The system utilizes a dual pick-up camera with conventional monochrome circuitry adapted in a simple manner to provide alternating left and right images in two contrasting colors, the receiver using conventional monochrome circuitry with standard interlaced scan pattern to produce a stereoscopic image by alternating the left and right images; stereo effect is enhanced by a relative motion technique and color is obtained with a special but simple picture tube adaptable to monochrome circuitry.

The present invention relates to television and more specifically to a stereoscopic color television system.

Stereoscopic television systems presently available usually require special viewing devices, such as polarized glasses, alternating sights, or synchronized shutter mechanisms. Other types involving multi-layered screens in which images are built up in depth require special cameras and transmission equipment and are limited to a narrow field of view in which the three dimensional image is effective. Color television systems are primarily based on a three-color group arrangement requiring special cameras and transmitters, special receivers and complex three gun picture tubes with elaborate masks. Since the basic television system now in general use involves a very large amount of equipment, it is desirable for any improvements to be compatible with existing transmitting and receiving apparatus.

It is the primary object of this invention, therefore, to provide a stereoscopic television system which utlizes a dual pick-up optical system in the camera to obtain the two images necessary for stereo effect, but which uses conventional monochrome camera circuitry and transmission equipment, and is capable of producing a stereoscopic image on existing receivers and picture tubes without additional visual aids.

Another object of this invention is to provide a stereoscopic television system in which color is introduced in the stereoscopic optical system, still using the basic monochrome transmission equipment, color being obtained at the receiver by a special, but simple picture tube which is operated by the conventional monochrome receiver circuitry and does not require multiple electron guns or elaborate synchronizing circuits.

Another object of this invention is to provide a stereoscopic television system wherein the stereo effect is enhanced by a slow continuous motion of the camera optics, corresponding to the normal (involuntary) motions of a person viewing an actual scene, thereby giving a very natural impression of depth to the scene.

A further object of this invention is to provide a stereoscopic television system, wherein the stereo optics are masked in such a manner that the primary subject is clearly displayed while the lateral edges of the scene are subdued, corresponding to the normal field of view of a person, and wherein out-of-focus double images of very near foreground objects are avoided.

In the drawings:

FIGURE 1 is a top plan view of a television camera incorporating the stereo optical system;

FIGURE 2 is a sectional view taken on line 2—2 of FIGURE 1;

FIGURE 3 is a front elevation view of the camera;

Similar characters of reference indicate similar or identical elements and portions throughout the specification and throughout the views of the drawing.

Camera with stereo optical system

Figure 4:
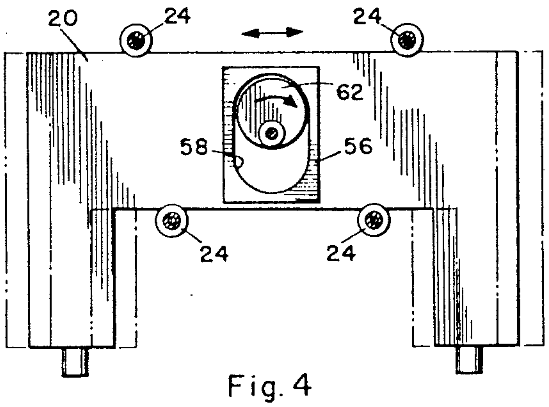
FIGURE 4 is an enlarged sectional view taken on line 4—4 of FIGURE 3 and showing the lateral motion of the optics.

The optical system is mounted as a unit on a carriage 20 which is supported on a base plate 22 between rollers 24, so that the carriage can move laterally. In the center and at the front of carriage 20 is a plate 26 carrying a pair of upright mirrors 28 and 30 disposed in a V configuration and secured to a common vertical hinge 32 at their forward edges. Coupled between the mirrors 28 and 30 is a telescopic element 34, such as a screw jack, or electrically or fluid operated jack, by which the convergence angle of the mirrors can be adjusted. On opposite sides of the mirror assembly are lenses 36 and 38 of conventional type with adjustable focus and outwardly of the lenses are prisms 40 and 42, respectively. An object 44 viewed by the system is reproduced as a pair of images by the mirrors 28 and 30 at substantially the spacing of the human eyes, the images being reflected outwardly through lenses 36 and 38, as indicated by directional arrows in FIGURE 1, then directed rearwardly by prisms 40 and 42 to a pair of image pick-up or camera tubes 46 and 48. This basic stereo optical system is not new in itself and is subject to variation. The electronic circuitry of the camera is indicated as unit 50 and the usual monitor at 52, an outer casing 54 being indicated in broken line. Camera tubes 46 and 48 may be conventional vidicons or image orthicons.

Fixed beneath the carriage 20 is a block 56 having an elongated slot 58 therein. Mounted on base plate 22 is a motor 60 driving an eccentric cam 62 which is engaged in slot 58, so that rotation of the cam causes lateral oscillation of carriage 20 on its supporting rollers 24, as indicated by the different positions in FIGURE 4.

Camera operation and picture composition

Figure 7:
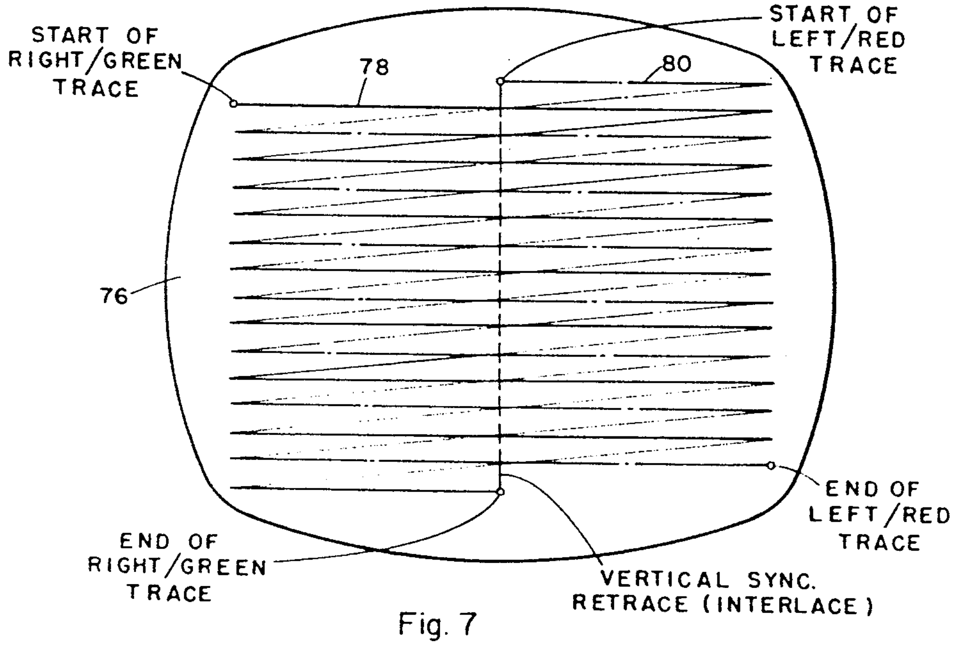
FIGURE 7 is a diagram of a picture tube face showing the arrangement of one image frame thereon.

The dual stereo images are reproduced in the receiver by using a basic principle of present television. The picture is composed of horizontal lines by an electron beam scanning horizontally and moving down the screen in stepped increments, the rate of scan being 30 complete frames per second. However, each frame is scanned by a first trace forming every other line, then when the trace reaches the bottom of the screen, the electron beam is retraced to the top and a second set of lines traced between the first set, as indicated in FIGURE 7. The technique is known as interlacing and the retrace is performed by a pulse signal in the vertical synchronization circuit. The operation and circuitry involved are well known and standardized and need not be described in detail.

Figure 5:
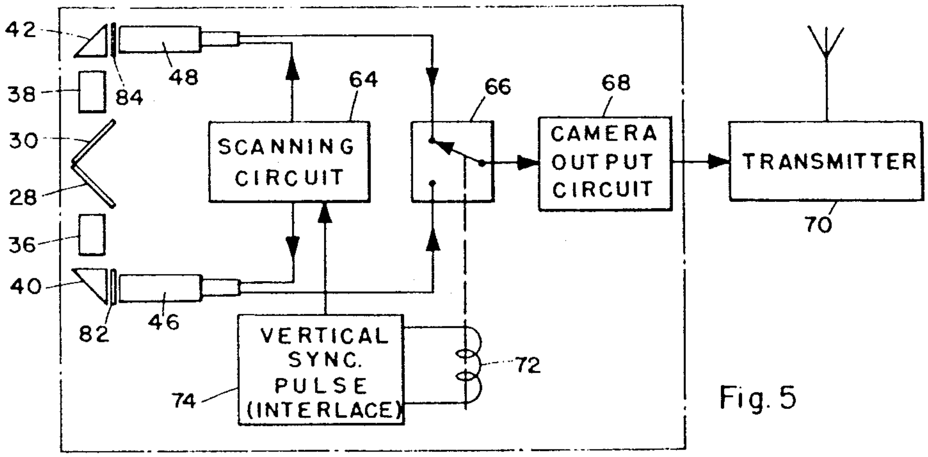
FIGURE 5 is a diagram of the basic camera circuitry.
Figure 6:
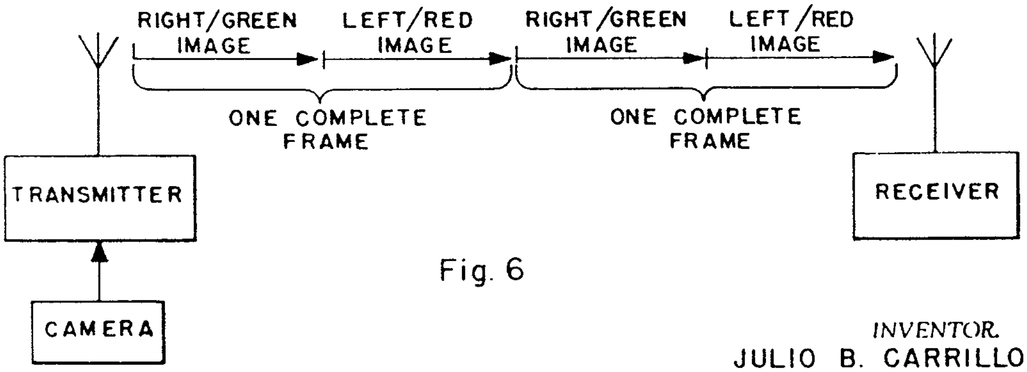
FIGURE 6 is a diagram of the manner of producing a stereoscopic color image.

As illustrated in FIGURE 5, both camera tubes 46 and 48 are operated simultaneously and continuously by the conventional scanning circuit 64, the outputs of the camera tubes being applied to a two-way switch 66, so that the outputs can be fed alternately to the camera output circuit 68 and then to the usual transmitter 70. By allowing both camera tubes to be scanned continuously and simply alternating the outputs to the transmitter, it is unnecessary to interrupt the scanning sequence when switching and alterations to the conventional camera circuits are minimized. Switch 66 is shown as being actuated by a relay 72 controlled by the vertical synchronizing pulse circuit 74, which provides the interlace action, although in actual practice the switch would be electronic and incorporated into the basic circuitry. As the camera operates the right hand image from camera tube 48 is transmitted, while the picture tube 76 is reproducing the right trace 78, as in FIGURE 7. When the interlace pulse occurs, switch 66 operates and the left hand image from camera tube 46 is transmitted while the picture tube is reproducing the left trace 80. Thus one complete frame is composed of a right hand image interlaced with a left hand image, each image being traced in one sixtieth of a second in the normal sequence of thirty frames per second. At the end of the left trace another interlace pulse returns the electron beam to the beginning of the right trace, the interlace pulse occurring at each half frame, or each one sixtieth of a second. Transmission consists of alternating right and left images, each pair comprising one full screen image or frame, as indicated in FIGURE 6, So far the system is capable of producing a stereoscopic image, in monochrome, on a conventional television receiver, the stereo effect being due to the well known phenomenon of vision persistence when viewing rapidly alternating left and right images. The stereo effect is enhanced by oscillating the camera optical system by means of the motor 60 to produce the impression of a moving view point. When a person is viewing a scene, the head is not normally completely stationary, with the result that there is a shifting of near objects with respect to distance objects. The effect is even more pronounced when looking from a moving vehicle and the scene takes on a very noticeable depth. That the effect can be applied to an image reproduced on a flat screen is well illustrated in high quality animated cartoons, in which characters are drawn on separate transparencies from foreground and background scenery and are photographed with the transparencies in spaced planes. Relative motions of the different transparencies in consecutive frames add a great apparent depth to the scene, even without the use of alternating stereo images. The oscillation of the carriage 20 is quite small, on the order of an inch, and may be at a rate of one oscillation every few seconds. The rate and magnitude of oscillation need not be constant, and various mechanisms other than the eccentric cam means may be employed.

Addition of color

Color is incorporated into the system in a very simple manner by using the two color phenomenon described by Edwin H. Land in an article published in Scientific American magazine of May 1959 and in various other articles and papers since. It was found that an object or scene could be photographed twice, once through a filter of one color and once through a filter of another color, to produce a pair of monochrome images. The colors red and green are particularly effective, but other colors may be used as long as there is a reasonable difference in their wavelengths. For the purposes of the present description red and green will be referred to as an example. When the two images are projected, the red image through a red filter and the green image without a filter, and the images superimposed in correct registration, a full color image appears. It is not necessary to pursue the theory of the phenonmenon, since the results have been well demonstrated.

The color feature is easily adaptable to the present stereo system by filtering the dual images to the camera tubes. As illustrated, a red filter 82 is placed in front of the left camera tube 46 and a green filter 84 in front of the right camera tube 48. The tubes themselves could be made selectively sensitive to particular colors, but the filters are more practical and make it possible to use existing tubes. The outputs of the camera tubes will then be composed of monochrome images corresponding to the light passed by the respective filters. These monochrome image signals, which alternate in sequence, can be handled by conventional monochrome camera and transmitter circuits, since no special color data or color synchronizing signals are involved. With reference to FIGURE 6, it will be seen that the color stereoscopic transmission is then comprised of a left/red image and a right/green image in each pair constituting a full frame transmission.

Since the transmitted images are composed of monochromatic data, they will be reproduced on existing television sets as stereoscopic monochrome images, as described above. To reproduce the color a special picture tube is required, but this is extremely simple compared to the usual three gun tube with its color spot groups and mask, and the tube can be operated by the existing circuitry of a conventional monochrome receiver. The special picture tube is the subject of a copending application Ser. No. 401,486, filed Oct. 5, 1964 and entitled Color Television Picture Tube, now abandoned and will be described herein only in sufficient detail to illustrate the color image reproduction.

Figure 8:
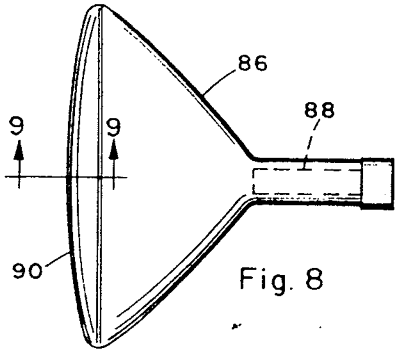
FIGURE 8 is a side elevation view of a color picture tube.
Figure 9:
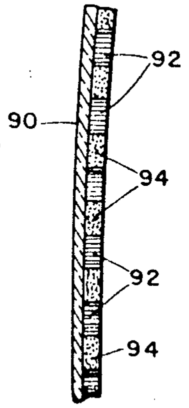
FIGURE 9 is an enlarged fragmentary sectional view taken on line 9—9 of FIGURE 8.
Figure 10:
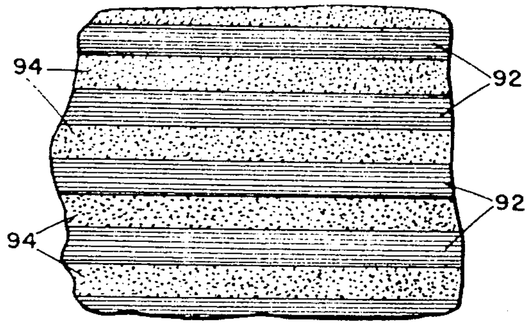
FIGURE 10 is an enlarged view of the inner face of the picture tube as indicated in FIGURE 9.

In the picture tube 86, illustrated in FIGURES 8–10, the glass envelope is conventional and a normal, single electron gun 88 is used, the only change from a standard monochromatic tube being in the phosphor coated face. Picture tube 86 has a face 90 on which are horizontal stripes of phosphor type material of alternate color response. Stripes 92 are of material which will glow red when energized by an electron beam and the alternate stripes 94 are of material which will glow the usual white, the various intensities and shadings being produced by variations in the intensity of the electron beam in the normal manner. Suitable materials and the methods of application to the picture tube face are well known.

The vertical synchronization of the receiver is adjusted, by the existing control which is usually readily accessible, until the left/red trace falls on the red stripes 90 and the right/green trace falls on white stripes 92. In terms of vision this is equivalent to projecting or view the red image through a red filter and the superimposed green image without a filter, as described in the two color phenomenon explanation, the result being a full color image. Vertical synchronization is not difficult, since the appearance of a full color image will indicate the proper register of the trace with the phosphor stripes. A stable vertical synchronization circuit is necessary, but good quality receivers show very little drift when properly tuned. Any drift noticed after a period of use is easily corrected by the existing control to bring the color image back into register.

Figure 11:
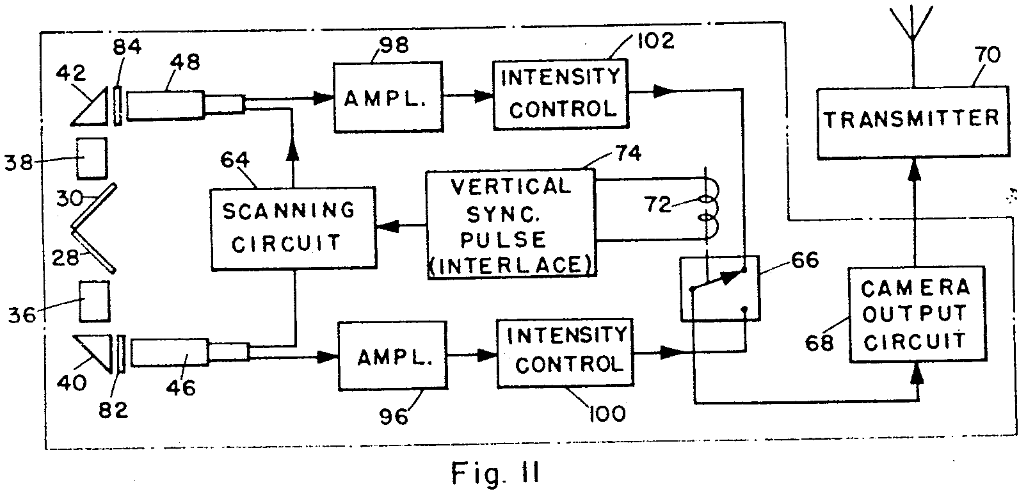
FIGURE11 is a diagram of a camera circuit with color balance control.

The intensity of the red image will probably be lower than that of the green image produced on white phosphor, so it may be necessary to have individual control of the two colors to avoid washing out of the colors by an excessively bright white trace. To avoid modification of television receivers the control can easily be incorporated into the camera, as illustrated in FIGURE 11. The outputs of the camera tubes 46 and 48 are fed through individual amplifiers 96 and 98 and individual intensity controls 100 and 102, respectively, before reaching switch 66, so that the relative intensities can be adjusted before transmission. The results can be seen on the camera monitor 52 and the studio monitors. No new electronic apparatus is involved, the arrangement being an adaptation of the conventional amplification and brightness control circuits used in existing cameras.

Optical masking

Figure 13:
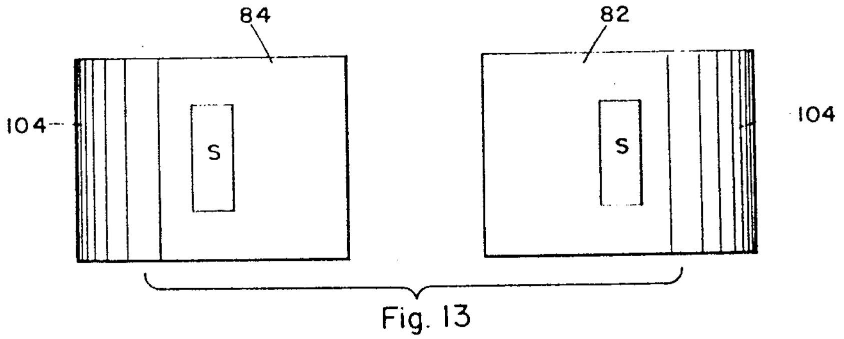
FIGURE 13 illustrates the pair of density control masks used in the optical system.
Figure 14:
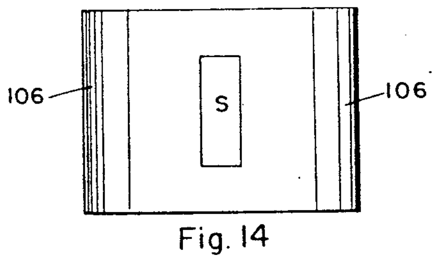
FIGURE 14 illustrates the composite image obtained with the masks.

To emphasize the primary subject at the center of the image and subdue the edges of the image to avoid distraction by undesirable brightness, the optical system may be provided with masks. These can be separate elements, but are preferably incorporated into the filters 82 and 84, which are conveniently located in the system. The outer edges of filters 82 and 84 have masked portions 104 on the outer edges, in which the filter material is shaded or otherwise treated to reduce the light transmission gradually toward the edge, the major portion of the filter retaining its normal transparency, as indicated in FIGURE 13. In the composite image formed by the alternating and apparently superimposed images, as indicated in FIGURE 14, the subject S in the center is at full brilliance, while the side edges are gradually subdued, as indicated at 106. The principle is not new in itself, but is usually accomplished by timed shutters or rotating masks of graduated density. The arrangement shown is very simply adapted to the filters already in use in the stereoscopic system.

Figure 12:
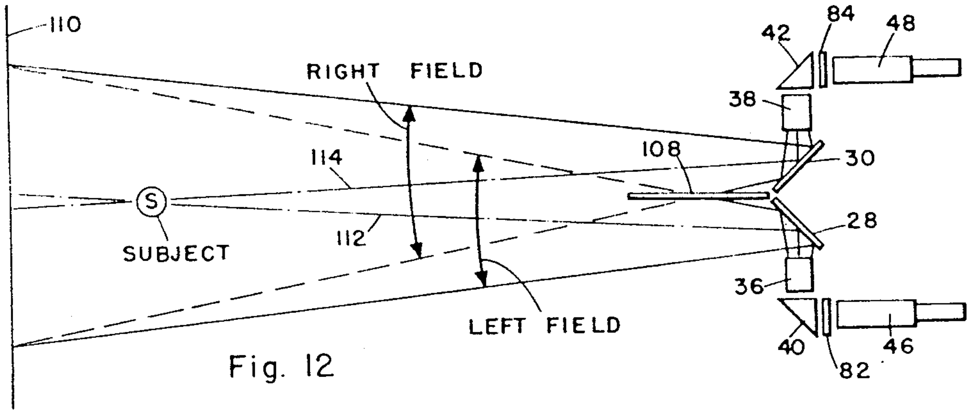
FIGURE 12 is a diagram of the stereo optical field.

Another type of masking to eliminate unwanted close foreground images is illustrated in FIGURE 12, wherein a vertical plate-like baffle 108 extends forwardly from the junction of mirrors 28 and 30, corresponding to the position of the bridge of the nose in normal vision. It will be evident that a portion of the field of view of both the right and left sides of the stereo optics is cut off, so that objects very close to the camera are not seen, yet the subject S and background 110 are in full view. The size of the baffle 108 will depend on the camera configuration, width of the field of view and the extent of foreground masking desired. This arrangement avoids distracting foreground images, which would appear double due to stereoscopic distortion at the limits of the effective field of stereoscopic view. For the best effect the convergence angle of mirrors 28 and 30 would be adjusted by element 34, so that the optical axes 112 and 114 of the two sides of the stereo optical system intersect at subject S.

The system is capable of producing a stereoscopic television broadcast, using conventional camera and transmitter circuitry, by adding a camera tube and its associated sub-circuits and a simple alternating switch triggered by existing signals. The broadcast is received in stereo on conventional monochrome receivers with no modifications. By using color filters in the stereoscopic optics of the camera, color is added to the signals, still using conventional monochrome camera and transmitter circuits. At the receiver the usual picture tube is replaced by a special color picture tube to receive stereoscopic color images, the special picture tube being operated by the monochrome receiver circuitry. The color broadcast can also be received in stereo and monochrome on conventional monochrome receivers.

It is understood that minor variation from the form of the invention disclosed herein may be made without departure from the spirit and scope of the invention, and that the specification and drawings are to be considered as merely illustrative rather than limiting.

I claim:

1. In a television system having means for scanning each complete image frame in a first series of horizontal lines and a second series of horizontal lines interlaced with the first series, and interlace pulse signal means for switching the scanning means from the end of one of said series of line to the start of the other series of lines, the combination therewith of stereoscopic image reproducing means, comprising:
- a pair of image pick-up tubes;
- a stereoscopic optical viewing system having means to provide left and right eye images of a subject and direct the images individually to said pick-up tubes;
- transmission means;
- a two-way switch connected between said transmission means and said pick-up tubes;
- actuating means connecting said two-way switch to the said interlace pulse signal means to switch said pick-up tubes alternately to said transmission means as each interlace pulse signal occurs;
- and means to oscillate said viewing system linearly at a slow rate in a substantially horizontal plane.

2. A television system according to claim 1, wherein said optical system includes a pair of lens units and a pair of angularly disposed reflectors to reflect images of a common subject in front of the optical system to said lens units; and a substantially vertical baffle mounted between said reflectors and extending forwardly therefrom to obstruct the central portion of the common field of view immediately forward of the optical system.

3. A television system according to claim 1 and including a pair of filters fixedly mounted in front of said pick-up tubes to intercept the light thereto, the corresponding side of each of said filters having gradually decreasing transparency from adjacent the center toward the edge thereof.

4. In a television system having means for scanning each complete image frame in a first series of horizontal lines and a second series of horizontal lines interlaced with the first series, and interlace pulse signal means for switching the scanning means from the end of one of said series of lines to the start of the other series of lines, the combination therewith of stereoscopic color image reproducing means, comprising:
- a pair of image pick-up tubes;
- a stereoscopic optical viewing system having means to to provide left and right eye images of a subject and direct the images individually to said pick-up tubes;
- transmission means;
- a two-way switch connected between said transmission means and said pick-up tubes;
- actuating means connecting said two-way switch to the said interlace pulse signal means to switch said pick-up tubes alternately to said transmission means as each interlace pulse signal occurs;
- a carriage on which said viewing system and said pick-up tubes are mounted;
- oscillating means coupled to said carriage to oscillate the carriage linearly at a slow rate in a substantially horizontal plane;
- and means to limit the receptivity of one of said pick-up tubes to one color and the receptivity of the other of said pick-up tubes to another, different color, said last mentioned means including a pair of fixed filters each gradually decreasing in transparency from adjacent the center to the edge on corresponding sides thereof.

References Cited

UNITED STATES PATENTS

| | | | |
|---|---|---|---|
| 2,307,188 | 1/1943 | Bedford | 178—6.5 |
| 2,757,232 | 7/1956 | Goodale | 178—5.4 |
| 3,020,341 | 2/1962 | Owens | 178—6.5 |
| 3,242,260 | 3/1966 | Cooper | 178—5.4 |
| 1,876,272 | 9/1932 | Bayer | 178—6.5 |
| 2,043,840 | 6/1936 | Singer | 350—314 |
| 2,076,482 | 4/1937 | Riszdorfer | 350—314 |
| 3,221,599 | 12/1965 | Land | 350—169 |
| 2,521,010 | 9/1950 | Homrighous | 178—6.5 |

FOREIGN PATENTS

| | | |
|---|---|---|
| 1,058,616 | 3/1954 | France. |

ROBERT L. GRIFFIN, Primary Examiner

JOSEPH A. ORSINO, Jr., Assistant Examiner

U.S. Cl. X.R.

178—5.4